April 28, 1964   A. W. DRANTZ   3,130,618
HYDRAULIC TOOL HOLDER
Filed April 3, 1963   3 Sheets-Sheet 3
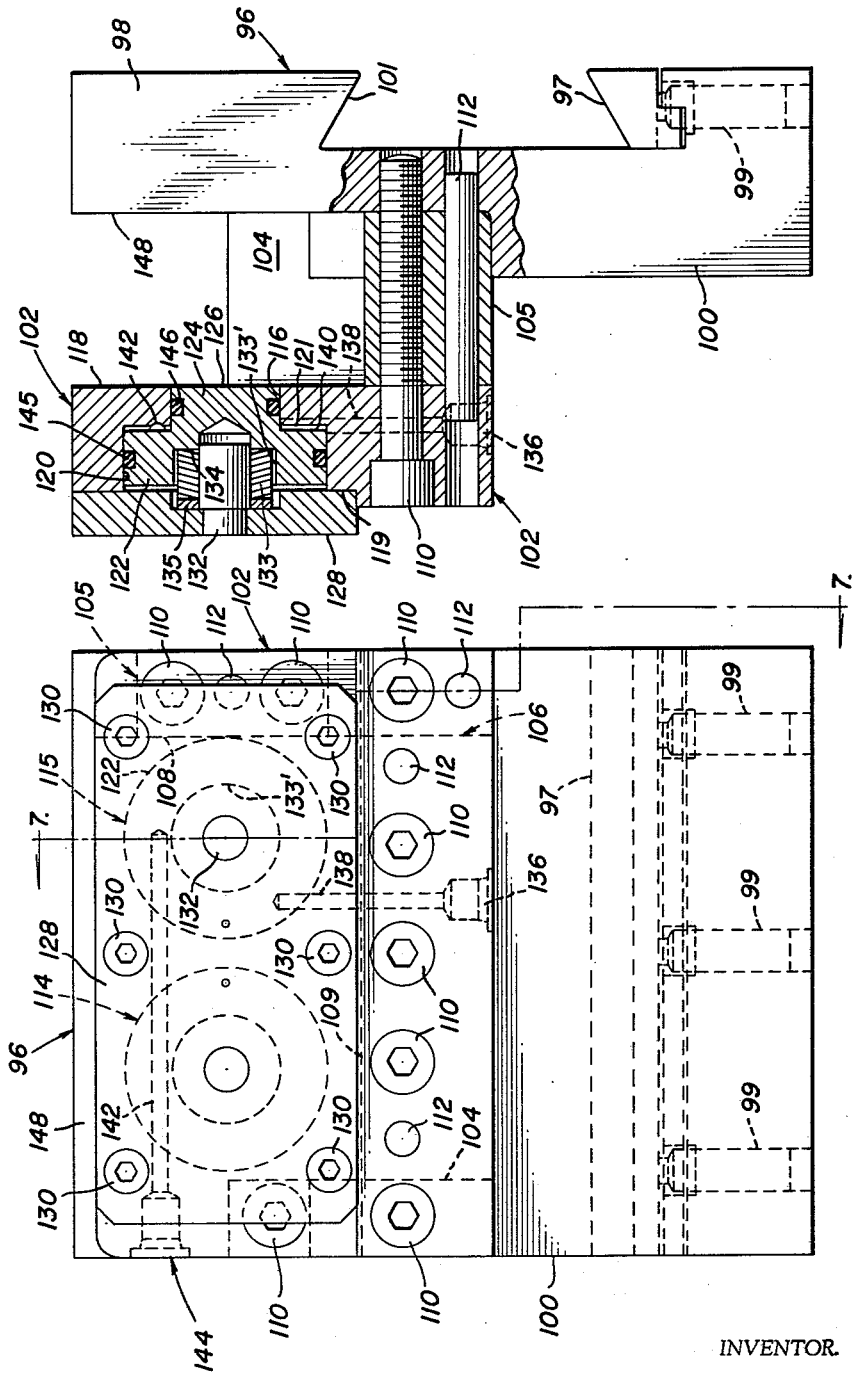
INVENTOR.
ALBERT W. DRANTZ
BY Brown, Jackson, Boettcher & Donner
ATTYS.

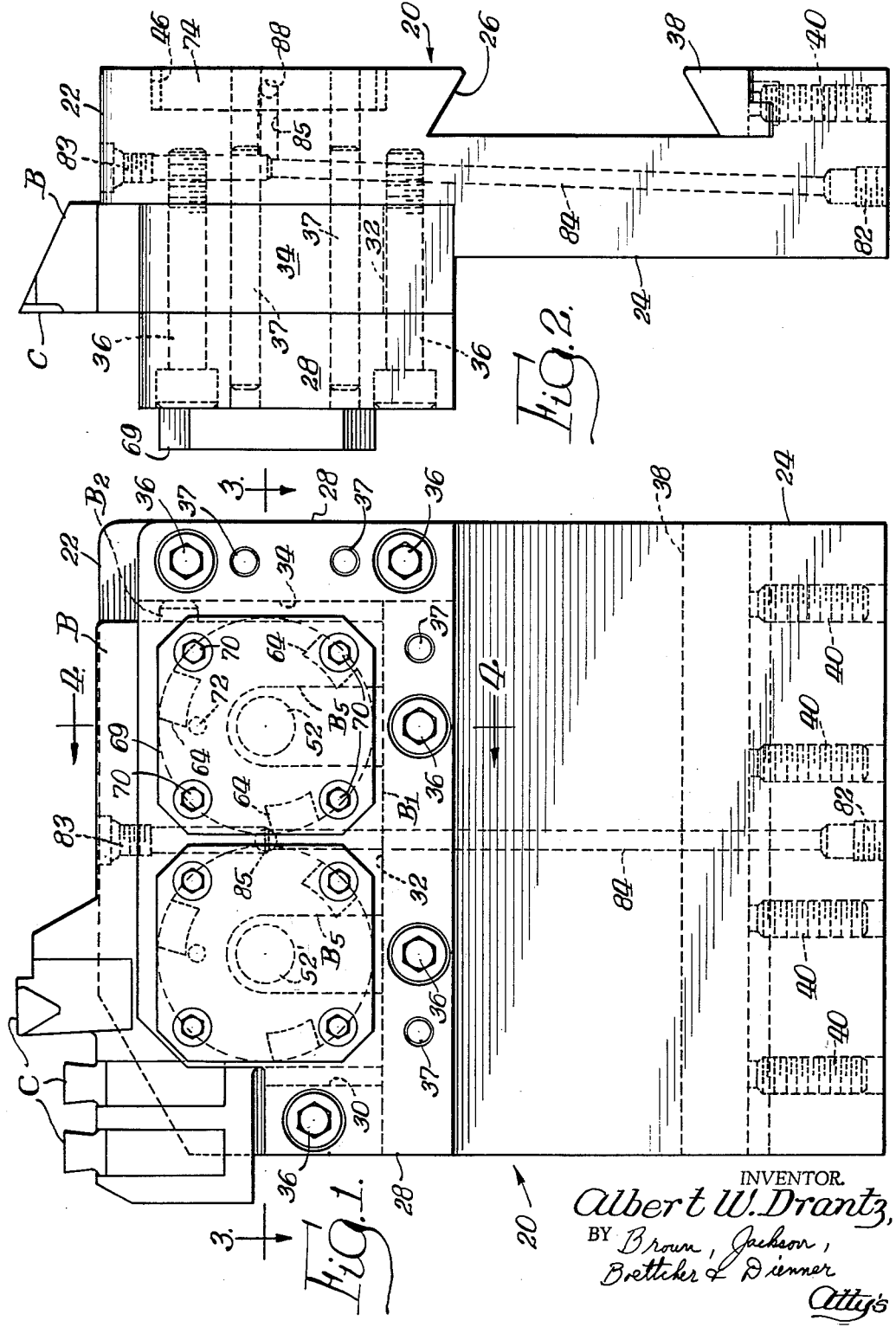

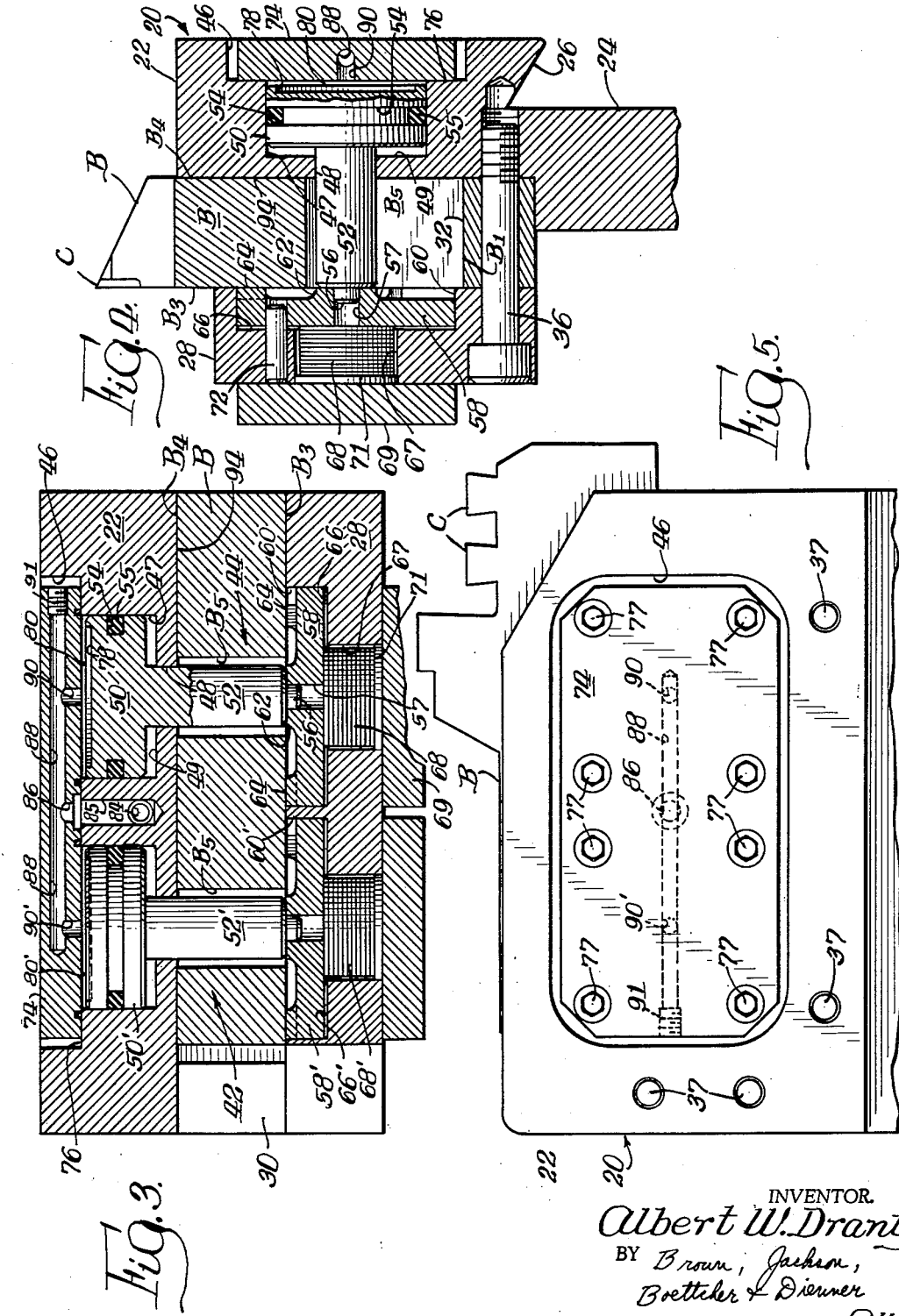

United States Patent Office 3,130,618
Patented Apr. 28, 1964

3,130,618
HYDRAULIC TOOL HOLDER
Albert W. Drantz, Norridge, Ill., assignor to Scully-Jones and Company, Chicago, Ill., a corporation of Illinois
Filed Apr. 3, 1963, Ser. No. 280,761
20 Claims. (Cl. 82—37)

This application is a continuation-in-part of my pending application Serial No. 150,331, filed November 6, 1961, entitled Hydraulic Tool Holder, which application is being abandoned upon the filing of the present application.

The present invention relates to a hydraulic tool holder for holding a cutter block or the like whereby one or more cutters may be secured in a cutter block and the latter mounted in the tool holder and clamped in a predetermined position therein.

More specifically, the invention relates to a hydraulic tool holder adapted to mount a cutter block or the like and having movable clamping means for holding the cutter block therein, the clamping means being biased towards a clamping position by spring means and being movable to open or released position through actuation of hydraulic means associated therewith.

Heretofore, it has been common to provide various types of cutter blocks which are adapted to hold one or more cutters therein, for example by means of clamping screws provided in the block so as to be engageable against a cutter to be held therein. Such cutter blocks are commonly provided with a dovetail slot or other suitable means for mounting the block on a machine tool, as for example at the front and rear cross slides of a Warner and Swasey chucking automatic.

Normally, machine tools with which such cutter blocks are used are set up for a new job without removing the cutter block from the machine. That is, the cutters previously held in the cutter block are removed therefrom and the cutters to be employed on the next job are secured in the block in certain predetermined positions. It is well known that the procedure for setting up a machine tool for a new job may take many hours, particularly with machines such as chucking automatics where the cutters must be set at front and rear cross slides and also at each of several stations on a turret.

It is possible to reduce the many hours of down time, during which an expensive machine tool must remain inoperative while it is being set up for a new job, by pre-setting cutters in cutter blocks to be employed in running the next job, while the machine tool is engaged in carrying out a previous job. In this manner, one job can be set up while another is being run, and when the latter is completed the several cutter blocks may be removed from the machine tool and cutter blocks having tools pre-set therein for the new job may be mounted thereon, whereby the machine tool need remain inoperative for only a relatively brief time between jobs.

The present invention is concerned with a hydraulic tool holder adapted to be mounted on a machine tool, normally to remain on the machine indefinitely rather than be removed after each job. My hydraulic tool holder is provided with means for seating and clamping a cutter block or the like of the type mentioned hereinabove, whereby at the end of one job the cutter block mounted in the hydraulic tool holder may be removed therefrom and a cutter block having cutters pre-set therein for the next job may be mounted therein and clamped in a predetermined position.

Accordingly, it is an object of my invention to provide a hydraulic tool holder which can be actuated to clamping or to open position with facility so as to permit the ready insertion and removal of cutter blocks or other like cutter-carrying members.

A further object of the invention is to provide a tool holder of the character mentioned above having clamping means wherein spring means are employed to bias the clamping means to clamped position and hydraulic means are utilized to move the clamping means to open position, whereby failure of the hydraulic means during a machining operation will not effect release of the cutter-carrying member being held.

Another object is to provide a tool holder of the character mentioned having a pair of perpendicular reference surfaces against which a cutter block having corresponding reference surfaces thereon may be seated prior to clamping the same, whereby cutters may be pre-set in the cutter block in predetermined relation to the reference planes of the latter, and the block subsequently clamped in the tool holder in a predetermined position therein.

In furtherance of the foregoing objects I provide a tool holder having a pair of body members spaced apart to provide a space therebetween for seating a cutter block or other cutter-carrying member. Spacer means are preferably secured in position between the body members to determine the space therebetween, whereby a pair of spacer means may be arranged perpendicular to one another to serve as reference planes against which a cutter block may be seated prior to clamping the same in operative position.

In one of my embodiments, I further provide clamping means in a recess in one of the body members and piston means in a recess in the other of the body members, the piston and clamping means being connected to one another so that the latter may be readily moved to open or released position by application of fluid pressure against the piston. Spring means are positioned to continuously act upon the clamping means to bias the same toward clamped position, whereby safety means are provided in that failure of the hydraulic system will not effect release of a cutter-carrying member gripped in the tool holder. In accordance with an alternative embodiment of the invention, I provide piston means having a clamp member integral therewith whereby both the piston and the clamp means are mounted in the same body member.

Other advantages and uses of my invention will be apparent, or become so, as I describe my invention in greater detail in conjunction with the accompanying drawings in which:

FIGURE 1 is a top plan view of a hydraulic tool holder embodying my invention, showing a cutter block having a plurality of cutters pre-set therein seated in the holder and clamped in position;

FIGURE 2 is a side elevational view of the tool holder of FIGURE 1;

FIGURE 3 is a vertical section taken substantially along the line 3—3 of FIGURE 1;

FIGURE 4 is a vertical section taken substantially along the line 4—4 of FIGURE 1;

FIGURE 5 is a fragmentary bottom plan view of the tool holder of FIGURE 1;

FIGURE 6 is a top plan view of a hydraulic tool holder illustrating an alternative embodiment of my invention wherein clamping means and piston means for actuating the same are housed in the same body member; and FIGURE 7 is a view, partly in side elevation and partly in section, taken substantially along the line 7—7 of FIGURE 6.

Referring now to FIGURES 1 and 2, a lower body member indicated generally at 20 has a front portion 22 adapted to support a cutter block, and an integral rear portion 24, the latter being provided with a dovetail slot 26 whereby the body 20 may be mounted on a dovetail suitably provided on a machine tool with which my hydraulic tool holder is to be associated. An upper body member 28 is spaced from the lower body member to provide a space therebetween for a cutter block or the like such as shown at B, the cutter block being provided with a plurality of cutters C which may be pre-set therein in a manner to be described more fully hereinafter.

In the embodiment being described, three spacer members are secured between the upper and lower body members 28 and 20 in order to determine the space therebetween for accommodating the cutter block B, the spacer members being arranged to frame the side and rear portions of said space whereby two of said spacer members may serve as reference surfaces against which a cutter block may be seated prior to being clamped in the tool holder. FIGURE 1 shows a side spacer 30, a rear spacer 32, and a side spacer 34, each of which is rectangular in cross sectional configuration. The upper and lower body members 28 and 20 and the spacer members 30, 32, and 34 are secured together by means of five cap screws 36 which extend through the upper body member 28, through corresponding ones of the spacer members, and into threaded engagement with the front portion 22 of the lower body member 20. A plurality of dowel pins 37 may also be inserted into holes provided therefor so as to extend from the upper body member through corresponding spacer members and into the lower body and thus further secure the assembly of said members.

The cutter block B to be used in conjunction with my tool holder may be provided with a flat rear surface as at $B_1$, and with a locating pin in one side of the block as at $B_2$, whereby $B_1$ and $B_2$ may serve as reference surfaces when the cutters C are pre-set therein, and may be caused to abut corresponding reference surfaces on the tool holder, the latter surfaces being the inside faces of the spacer members 32 and 34, respectively. In other words, cutters C may be pre-set in the cutter block B by positioning the latter on suitable gages and setting the cutters a predetermined distance from the rear face $B_1$ of the cutter block and from the end of the locating pin $B_2$ provided in said block. Thereafter, the cutter block B may be positioned between the upper and lower body members 28 and 20 of the tool holder so that the surface $B_1$ seats against the inside face of the spacer 32, and the end of the pin $B_2$ seats against the inside face of the spacer 34, spacers 32 and 34 normally being perpendicular to one another, after which the cutter block may be clamped in said position by means to be described hereinafter. In this manner, cutters may be pre-set in a cutter block while another job is being run on a machine tool, and the cutter block may later be readily seated and clamped in the hydraulic tool holder to hold the cutters C in predetermined positions with respect to a work piece held in the machine tool.

The dovetail slot 26 in the lower body 20 may be defined on one side thereof in known manner by providing a gib or clamp 38 which may be adjustably positioned by a plurality of adjusting screws such as shown at 40, whereby the hydraulic tool holder may be clamped in desired position on a dovetail suitably provided on a machine tool for such purposes.

Referring now to FIGURES 3 and 4, there is shown a pair of clamping member assemblies indicated generally at 42 and 44. Any desired number of clamping means can be provided for clamping a cutter-carrying member such as the block B between the body members 28 and 20, and in this instance only the clamping assembly 44 will be described in detail, since it is substantially identical to the clamping assembly 42.

It will be seen that a large, generally rectangular recess 46 (shown best in FIGURE 5) is provided in the bottom of the front portion 22 of the lower body member 20, and at the base of the recess 46 there is a cylindrical bore or recess 47 extending toward the inside face of the portion 22 and terminating at a ledge 49, the latter having therein a bore 48 of reduced diameter which extends through the portion 22 to communicate with the space between the upper and lower body members.

A piston member 50, having integral therewith connecting means comprising a rod 52, is disposed within the bore 47 so as to be adapted to reciprocate upwardly and downwardly therein, said piston having an O-ring groove 54 carrying an O-ring 55 therein to provide a seal between the piston and the body portion 22. The rod 52 tranverses the space between the upper and lower body members 28 and 20, and the end thereof has an integral portion 56 of reduced diameter on which a clamping disc 58 is mounted, the disc 58 being accommodated in a cylindrical bore or recess 60 provided at the inside face of the upper body member 28. The clamping disc 58 has a boss or hub portion 62 having a bore 57 for mounting the disc on the rod end 56, and the disc is further provided with a plurality of axially inwardly projecting clamping surfaces (in this case three) such as shown at 64.

The recess or bore 60 in the upper body member 28 terminates at a ledge portion 66, the latter having a bore of reduced diameter 67 which extends through to the outer top face (shown at the bottom of FIGURE 3 which is inverted) of the upper body 28. Spring means 68 are provided in the reduced diameter recess portion 67 to bear against the outer face of the clamping disc 58 and bias the same inwardly toward clamping position, the spring means being retained in said recess by a cover plate 69 which is secured to the upper body 28 with four cap screws 70 (see FIGURE 1). The cover plate 69 is shown as having a boss 71 which extends slightly into the recess 67 to bear against the outer portion of the spring means 68. Any desired type of spring or yieldable means may be employed within the bore or recess 67, and it has been found that a plurality of Belleville spring washers are well suited to such use.

As shown in FIGURE 4, a dowel pin 72 may be inserted in holes provided therefor so as to extend through the upper body member 28 and into the clamping disc 58 to prevent rotation of the disc and thereby guide the same as it reciprocates during clamping and unclamping of a cutter block B.

As previously described, the piston 50 is disposed within the cylindrical bore or recess 47 in the lower body portion 22 for reciprocation inwardly and outwardly therein. A cover plate 74 (see FIGURES 3–5) is positioned within the large, generally rectangular recess 46 in the lower body portion so as to bear against a ledge 76 at the base of the recess 46, and the cover plate 74 is secured to the lower body portion by eight cap screws 77 (see FIGURE 5). It will be seen that the cover plate 74 is spaced from the outer bottom face of the piston 50 (and in a similar manner from the piston 50′), which face may if desired have a shallow cylindrical recess 78, so as to provide a substantially sealed enclosure 80 between the piston 50 and the cover plate. A similar sealed enclosure 80′ is provided between the cover plate and the piston member 50′. Means will now be described for conducting fluid such as oil under pressure to the sealed enclosures 80 and 80′ to actuate the pistons 50 and 50′ inwardly against the force of the spring means 68 and 68′ and thereby effect movement of the clamping discs 58 and 58′ to open or retracted positions.

As shown in FIGURES 1 and 2, the lower body 20 is provided with an oil inlet at 82, and a passageway 84 which extends therefrom to the front end of the body 20, where a plug 83 is provided to close the end of the passage. The passageway 84 extends downwardly at 85 between the pistons 50 and 50′ to communicate with a connecting passageway 86 provided at the inside face of the cover plate 74, as is best shown in FIGURE 3. The passage 86 communicates with a passage 88 which is perpendicular to passage 86 and extends in two directions therefrom so as to communicate with the sealed enclosures 80 and 80′ by means of short vertical passages 90 and 90′, the end of the passage 88 being closed by a plug indicated at 91. It will now be understood that by connecting a source of fluid under pressure (not shown) at the inlet 82 of the body member 20, oil or the like can be conducted through the above-described passages to the sealed enclosures 80 and 80′ so as to act against the pistons 50 and 50′ and thereby actuate the same inwardly against the force of the spring means 68 and 68′.

The embodiment of my hydraulic tool holder being described herein is particularly well suited to mount a cutter block B having substantially flat top and bottom surfaces as shown at $B_3$ and $B_4$, respectively, in FIGURE 4. It will be seen that the surface $B_4$ is adapted to bear against the inside face 94 of the lower body portion 22, whereas the clamping surfaces 64 on the clamping disc 58 are adapted to bear against the surface $B_3$ when the disc is in clamping position and thereby frictionally grip the cutter block. With the embodiment described hereinabove, it is of course necessary to provide U-shaped slots or the like in the cutter block, such as shown at $B_5$ in FIGURES 1 and 3, in order that the rod members 52 and 52′ will not interfere with the positioning of a cutter block between the body members 20 and 28 as shown.

The operation of my hydraulic tool holder may be described briefly as follows. Oil under pressure is conducted from the inlet 82 through the various passageways to the sealed enclosures 80 and 80′ so as to act upon the outer faces of the pistons 50 and 50′ and thereby cause the clamping discs to be retracted from their respective clamping positions and seated against ledges 66 and 66′ at the bases of the recesses 60 and 60′. In this position, the various clamping surfaces 64 will be retracted sufficiently to permit insertion of a cutter block such as the block B in the space between the body members 20 and 28 so as to be seated against the spacer members 32 and 34. Thereafter, the hydraulic pressure is released so as to permit the Belleville spring washers 68 and 68′ to move the clamping discs 58 and 58′ inwardly until the clamping surfaces 64 bear against the surface $B_3$ of the cutter block and securely clamp the same in position.

It will be understood that hydraulic pressure is not employed to clamp the cutter block in position, whereby accidental loss of pressure in the hydraulic system will not effect release of the cutter block. When it is desired to release the cutter block, application of hydraulic pressure, for example by manually opening a valve, will again move the clamping discs to retracted or open position.

FIGURES 6 and 7 illustrate an alternative embodiment of the present invention wherein a clamp member and a piston for actuating the same are housed in the same body member so as to eliminate the need for a connecting rod such as the rod 52 which traverses the space between the body members. There is shown a lower body member indicated generally at 96 having a forward portion 98 adapted to support a cutter block, and having an integral rear portion 100 which is provided with a dovetail slot 101, a gib or clamp 97, and a plurality of adjusting screws 99, whereby the body 96 may be mounted and clamped in position on a dovetail suitably provided on a machine tool with which my hydraulic tool holder is to be associated. For example, the tool holder assembly shown may be mounted on the front cross slide of a chucking automatic so that a cutter block having one or more cutters pre-set therein may readily be mounted in the holder and gripped therein at the cross slide for carrying out a machining operation. An upper body member 102 is spaced from the lower body member so as to provide a space therebetween for a cutter block of the general type described earlier herein.

A pair of side spacer blocks 104 and 105 and a rear spacer block 106 are disposed between the body members 96 and 102 so as to frame the side and rear portions of the space between the body members. The spacer blocks serve to control the distance between the upper and lower body members, and the inner surfaces on two of the spacer blocks may serve as reference surfaces against which a cutter block may be seated prior to being clamped in the tool holder. Thus, an inner surface 108 on the side spacer 105 and an inner surface 109 on the rear spacer 106, which surfaces are perpendicular to one another, may serve as reference surfaces for seating a cutter block.

The upper and lower body members 96 and 102 and the spacer members 104, 105 and 106 are secured together by means of eight cap screws 110 which extend through the upper body member 102, through corresponding ones of the spacers, and into threaded engagement with the lower body member 96. A plurality of dowel pins 112 are also inserted into holes provided therefor so as to extend from the upper body member through corresponding spacers and into the lower body member to thereby further secure the assembly of such members.

As in the first embodiment described earlier herein, the embodiment illustrated in FIGURES 6 and 7 includes a pair of clamping members and a pair of corresponding pistons associated therewith, and only one of the clamps and pistons will be described in detail herein, it being understood that any desired number of substantially identical clamp assemblies may be provided for gripping a cutter block which is seated between the upper and lower body members 96 and 102. Thus, a pair of clamp assemblies are indicated generally at 114 and 115 in FIGURE 6, but only the clamp assembly 115 as shown in FIGURE 7 will be specifically described.

It will be seen that the upper body member 102 has a bore 116 which extends through to an inner surface 118 on the body member, and an opposite side or top surface 119 of the upper body member is counterbored at 120 to form a relatively large diameter cylindrical recess which terminates at an annular shoulder or ledge 121. A piston 122 has an outer diameter only slightly less than the diameter of the counterbore 120 so as to be axially slidable therein through a short stroke, and the piston is provided with an integral cylindrical nose or clamp portion 124 of a reduced diameter which is slightly less than the diameter of the bore 116 in the body member so as to be slidable therein. The nose portion 124 is adapted to serve as a clamp to grip a cutter block which is seated between the upper and lower body members 96 and 102, and such portion is formed with a substantially flat inner clamping surface 126 for engaging such a cutter block.

A top cover plate 128 extends substantially the full width of the tool holder so as to cover both of the clamp assemblies 114 and 115, and the cover plate is rigidly secured to the upper body member 102 by six cap screws 130. It will now be understood that the piston 122 is slidable axially through a short stroke within the upper body member 102. When the piston is moved to its retracted position, the clamping surface 126 is flush with or slightly recessed relative to the inner surface 118 of the upper body member, whereas when the piston is moved to its extended position wherein it engages against the peripheral shoulder 121 in the body member, the nose or clamp portion 124 projects beyond the surface 118 into the space between the body members 98 and 102 so as to be adapted to clamp tightly against a cutter block which is seated therebetween.

The cover plate 128 fixedly mounts a stud 132 which projects inwardly into the upper body member and which serves as a retainer for a plurality of Belleville spring washers 133. The spring washers 133 bear against the cover plate 128 and they are disposed with a bore 133′ in the piston 122 so as to be seated against an annular ledge 134 formed within the piston. In this manner, the springs will urge the piston 122 and the integral clamp portion 124 towards an extended or operative clamping position. A spacer 135 may be mounted on the stud 132 before the spring washers are assembled thereon to serve as a means for preloading the springs as desired.

A fluid inlet is provided at 136, and a fluid passage 138 connects the inlet with a pressure chamber defined by the annular shoulder 121 and an annular face 140 on the inner or lower side of the piston 122, whereby introduction of a fluid such as oil under pressure into the inlet 136 will cause the piston 122 to be moved against the force of the compression springs 133 into a retracted position wherein the clamp surface 126 will be flush with or recessed relative to the surface 118 of the upper body portion.

A fluid passage 142 connects the pressure chamber of the clamp assembly 115 with a similar pressure chamber associated with the clamp assembly 114, and the passage 142 extends to an exterior side wall of the upper body member 102 where it is closed by a removable plug 144. Accordingly, removal of the plug 144 will permit bleeding of oil or the like from the two pressure chambers. The pressure chambers are normally sealed by a pair of O-rings such as shown at 145 and 146.

It will be understood from the foregoing that the operation of the alternative embodiment described above is generally similar to the operation of the embodiment shown in FIGURES 1–5 in that pressure is supplied at the fluid inlet 136 to retract the clamp member 124 so as to permit a cutter block to be positioned between the upper and lower body members 96 and 102 and seated against the reference surfaces 108 and 109, after which the pressure is released and the springs 133 cause the clamp 124 to be extended tightly against the cutter block. In this manner, the cutter block is gripped between a flat inner surface 148 on the lower body member 96 and a pair of clamp surfaces such as the clamp surface 126.

The alternative embodiment of FIGURES 6 and 7 may offer important advantages in certain applications since the clamp member is formed integral with the piston member and is mounted in the same body member, in this instance the body member 102, whereby it is not necessary to provide a connecting rod which traverses the space between the body members, and it is therefore not necessary to provide slots in the cutter block such as shown at $B_5$ in FIGURES 1 and 3.

The improved hydraulic tool holder described herein is suitable for use on numerous types of machine tools to mount various types of cutter-carrying members, and the foregoing description is intended only to illustrate one application of my invention. Therefore, while I have illustrated my invention in certain preferred forms, I do not intend to be limited to such forms, except insofar as the appended claims are so limited, since modifications coming within the scope of my invention will be readily suggested to others with my disclosure before them.

I claim:

1. A hydraulic tool holder comprising a pair of body members spaced apart to provide a space therebetween for seating a cutter block or the like, a first recess in one of said body members, a piston mounted in said recess for axial sliding movement therein, a second recess in one of said body members, clamping means mounted in said second recess for axial sliding movement therein between a clamping position wherein said means is adapted to engage a cutter block seated between said body members and an open position wherein said clamping means is retracted, connecting means for connecting said piston to said clamping means, spring means for biasing said clamping means toward clamping position, and hydraulic means associated with said piston for moving said clamping means to open position.

2. A hydraulic tool holder comprising a pair of body members spaced apart to provide a space therebetween for seating a cutter block or the like, a first recess in one of said body members, a piston mounted in said recess for axial sliding movement therein, a second recess in the other of said body members, clamping means mounted in said second recess for axial sliding movement therein between a clamping position wherein said means is adapted to engage a cutter block seated between said body members and an open position wherein said clamping means is retracted, connecting means traversing the space between said body members for connecting said piston to said clamping means, spring means for biasing said clamping means toward clamping position, and hydraulic means associated with said piston for moving said clamping means to open position.

3. A hydraulic tool holder comprising a pair of body members spaced apart to provide a space therebetween for seating a cutter block or the like, a first recess in one of said body members, a piston mounted in said recess for axial sliding movement therein toward and away from said space, a second recess provided at the inside face of the other of said body members so as to be adjacent said space, clamping means mounted in said second recess for axial sliding movement therein between a clamping position wherein said means is adapted to engage a cutter block seated between said body members and an open position wherein said clamping means is retracted, connecting means traversing the space between said body members for connecting said piston to said clamping means, spring means disposed adjacent an outer portion of said clamping means to bias said clamping means toward said space to clamping position, and means for conducting fluid under pressure to a space adjacent an outer portion of said piston so as to move said piston toward said space and thereby move said clamping means to open position.

4. A hydraulic tool holder of the type set forth in claim 2 wherein the portions of said pair of body members adjacent said space comprise substantially flat parallel surfaces, one of which is adapted to support a cutter block which is seated in said space and clamped therein by said clamping means.

5. A hydraulic tool holder of the type set forth in claim 4 characterized by a pair of perpendicular spacer means secured in position between said body members to control the space therebetween, one of said spacer means comprising a rear wall for said space and the other of said spacer means comprising a side wall substantially perpendicular to said rear wall whereby said spacer means may serve as reference planes against which a cutter block may be seated prior to clamping the same between said body members.

6. A hydraulic tool holder comprising a pair of body members spaced apart to provide a space therebetween for seating a cutter block or the like, a first recess in one of said body members, a piston mounted in said recess for axial sliding movement therein toward and away from said space, a first cover plate secured to said body member outwardly of said piston to provide a substantially sealed enclosure between said piston and said cover plate, a second recess provided at the inside face of the other of said body members so as to be adjacent said space, a reduced portion of said second recess extending to the outer face of said other body member, clamping means mounted in said second recess for axial sliding movement therein between a clamping position wherein said means is adapted to engage a cutter block seated between said body members and an open position wherein said clamping means is retracted, connecting means traversing the space between said body members for connecting said piston to said clamping means, spring means disposed in the reduced portion of said second recess so as to bear against said clamping means and bias the same toward said space to clamping position, a second cover plate secured to said other body member for retaining said spring means in said second recess, and means for conducting fluid under pressure to said sealed enclosure for moving said clamping means to open position.

7. A hydraulic tool holder of the type set forth in claim 6 wherein said first cover plate is provided with an interior passageway communicating with said sealed enclosure, and wherein said fluid conducting means is connected to said passageway.

8. A hydraulic tool holder comprising a pair of body members spaced apart to provide a space therebetween for seating a cutter block or the like, a first recess in one of said body members, a cylindrical piston mounted in said recess for axial sliding movement therein, a second recess in the other of said body members, a connecting rod integral with said piston and traversing the space between said body members so as to extend into said second recess, a clamping disc mounted on the end of said rod so as to be positioned in said second recess for axial sliding movement therein between a clamping position wherein said disc is adapted to engage a cutter block seated between said body members and an open position wherein said disc is retracted, spring means for biasing said clamping means toward clamping position, and hydraulic means associated with said piston for moving said clamping means to open position.

9. A hydraulic tool holder of the type set forth in claim 2 wherein one of said pair of body members is provided with a dovetail slot for mounting said holder on a machine tool.

10. A hydraulic tool holder comprising a pair of body members spaced apart to provide a space therebetween for seating a cutter block or the like, a first recess in one of said body members, a cylindrical piston mounted in said recess for axial sliding movement therein toward and away from said space, a first cover plate secured to said body member outwardly of said piston to provide a substantially sealed enclosure between said piston and said cover plate, said cover plate being provided with an interior passageway communicating with said sealed enclosure, a second recess provided at the inside face of the other of said body members so as to be adjacent said space, a reduced portion of said second recess extending to the outer face of said other body member, a connecting rod integral with said piston and traversing the space between said body members so as to extend into said second recess, a clamping disc mounted on the end of said rod so as to be positioned in said second recess for axial sliding movement therein between a clamping position wherein said disc is adapted to engage a cutter block seated between said body members and an open position wherein said disc is retracted, spring means disposed in the reduced portion of said second recess so as to bear against said clamping disc and bias the same toward said space to clamping position, a second cover plate secured to said other body member for retaining said spring means in said second recess, means connected to said passageway for conducting fluid under pressure to said sealed enclosure to move said clamping means to open position, and a pair of perpendicular spacer means secured in position between said body members to control the space therebetween, one of said spacer means comprising a rear wall for said space and the other of said spacer means comprising a side wall substantially perpendicular to said rear wall whereby said spacer means may serve as reference planes against which a cutter block may be seated prior to clamping the same between said body members.

11. A hydraulic tool holder comprising a pair of body members spaced apart to provide a space therebetween for seating a cutter block or the like, a recess formed in one of said body members, a piston disposed in said recess for axial sliding movement therein, clamping means disposed in said recess for axial sliding movement toward and away from the other of said body members between an operative clamping position wherein said clamping means is adapted to engage a cutter block seated between said body members and an inoperative position wherein said clamping means is retracted, said clamping means being operatively associated with said piston so as to be actuated thereby, spring means for biasing said clamping means toward clamping position, and hydraulic means associated with said piston for moving said clamping means to retracted position.

12. A hydraulic tool holder comprising a pair of body members spaced apart to provide a space therebetween for seating a cutter block or the like, said body members having substantially flat parallel surfaces adjacent said space, a recess formed in one of said body members, a piston disposed in said recess for axial sliding movement therein, clamping means disposed in said recess for axial sliding movement therein toward and away from the other of said body members between an operative clamping position wherein said clamping means is adapted to project beyond the said flat surface of said one body member to engage a cutter block seated between said body members and an inoperative position wherein said clamping means is retracted, said clamping means being operatively associated with said piston so as to be actuated thereby, spring means for biasing said clamping means toward clamping position, and hydraulic means associated with said piston for moving said clamping means to retracted position.

13. A hydraulic tool holder comprising a pair of body members spaced apart to provide a space therebetween for seating a cutter block or the like, a recess formed in one of said body members, a piston disposed in said recess for axial sliding movement therein, a clamp portion of reduced size formed integral with a side of said piston facing the other of said body members, said clamp portion being movable axially with said piston toward and away from the other of said body members between an operative clamping position wherein said clamp portion is adapted to engage a cutter block seated between said body members and an inoperative position wherein said clamping means is retracted, spring means for biasing said piston and clamp portion toward clamping position, and hydraulic means associated with said piston for moving said piston and clamp portion to retracted position.

14. A hydraulic tool holder comprising a pair of body members spaced apart to provide a space therebetween for seating a cutter block or the like, said body members having substantially flat parallel surfaces adjacent said space, a recess formed in one of said body members, a piston disposed in said recess for axial sliding movement therein, a clamp portion of reduced size formed integral with a side of said piston facing the other of said body members, said clamp portion being movable axially with said piston toward and away from said other body member between an operative clamping position wherein said clamp portion is adapted to project beyond the said flat surface of said one body member to engage a cutter block seated between said body members and an inoperative position wherein said clamp portion is retracted, spring means for biasing said piston and clamp portion toward clamping position, and hydraulic means associated with said piston for moving said piston and clamp portion to retracted position.

15. The invention of claim 14 wherein said clamp portion is substantially cylindrical in configuration and is provided with a substantially flat end surface adapted to clamp against a cutter block which is seated between said body members.

16. A hydraulic tool holder comprising a pair of body members spaced apart to provide a space therebetween for seating a cutter block or the like, a pair of spacer members secured in position between said body members to control the space therebetween, one of said spacer members comprising a rear wall for said space and the other comprising a side wall substantially perpendicular to said rear wall whereby said spacer members may serve as reference surfaces against which a cutter block to be clamped may be seated, a recess formed in one of said body members, a piston disposed in said recess for axial sliding movement therein, clamping means disposed in said recess for axial sliding movement toward and away from the other of said body members between an operative clamping position wherein said clamping means is adapted to engage a cutter block seated between said body members and an inoperative position wherein said clamping means is retracted, said clamping means being operatively associated with said piston so as to be actuated thereby, spring means for biasing said clamping means toward clamping position, and hydraulic means associated with said piston for moving said clamping means to retracted position.

17. A hydraulic tool holder comprising a pair of body members spaced apart to provide a space therebetween for seating a cutter block or the like, said body members having substantially flat parallel surfaces adjacent said space, a pair of spacer members secured in position between said body members to control the space therebetween, one of said spacer members comprising a rear wall for said space and the other comprising a side wall substantially perpendicular to said rear wall whereby said spacer members may serve as reference surfaces against which a cutter block to be clamped may be seated, a recess formed in one of said body members, a piston disposed in said recess for axial sliding movement therein, a cylindrical clamp portion of reduced diameter formed integral with a side of said piston facing the other of said body members, said clamp portion having a substantially flat end surface adapted to clamp against a cutter block and said clamp portion being movable axially with said piston toward and away from said other body member between an operative clamping position wherein said clamp portion is adapted to project beyond the said flat surface of said one body member to engage a cutter block seated between said body members and an inoperative position wherein said clamp portion is retracted, spring means for biasing said piston and clamp portion toward clamping position, and hydraulic means associated with said piston for moving said piston and clamp portion to retracted position.

18. A hydraulic tool holder comprising a pair of body members spaced apart to provide a space therebetween for seating a cutter block or the like, a recess formed in one of said body members, clamping means disposed in said recess for axial sliding movement toward and away from the other of said body members between an operative clamping position wherein said clamping means is adapted to engage a cutter block seated between said body members and an inoperative position wherein said clamping means is retracted, a piston operatively associated with said clamping means for actuating the latter, spring means for biasing said clamping means toward clamping position, and hydraulic means associated with said piston for moving said clamping means to retracted position.

19. A hydraulic tool holder comprising a pair of body members spaced apart to provide a space therebetween for seating a cutter block or the like, said body members having substantially flat parallel surfaces adjacent said space, a recess formed in one of said body members, clamping means disposed in said recess for axial movement toward and away from the other of said body members between an operative clamping position wherein said clamping means projects beyond the said flat surface of said one body member to engage a cutter block seated between said body members and an inoperative position wherein said clamping means is retracted, a piston operatively associated with said clamping means for actuating the latter, spring means for biasing said clamping means toward clamping position, and hydraulic means associated with said piston for moving said clamping means to retracted position.

20. A hydraulic tool holder of the type set forth in claim 19 wherein a pair of spacer members are secured in position between said body members to control the space therebetween, one of said spacer members comprising a rear wall for said space and the other comprising a side wall substantially perpendicular to said rear wall whereby said spacer members may serve as reference surfaces against which a cutter block may be seated prior to clamping the same between said body members.

No references cited.